US009365409B2

(12) United States Patent
Bressani

(10) Patent No.: US 9,365,409 B2
(45) Date of Patent: Jun. 14, 2016

(54) APPARATUS FOR METERING LIQUIDS

(71) Applicant: STARDALE LTD., Hong Kong (CN)

(72) Inventor: Gian Marco Bressani, Hong Kong (CN)

(73) Assignee: STARDALE LTD., Hong Kong (CN)

( * ) Notice: Subject to any disclaimer, the term of this patent is extended or adjusted under 35 U.S.C. 154(b) by 140 days.

(21) Appl. No.: 14/359,018

(22) PCT Filed: Nov. 20, 2012

(86) PCT No.: PCT/IB2012/056568

§ 371 (c)(1),
(2) Date: May 16, 2014

(87) PCT Pub. No.: WO2013/076649

PCT Pub. Date: May 30, 2013

(65) Prior Publication Data

US 2014/0312064 A1 Oct. 23, 2014

(30) Foreign Application Priority Data

Nov. 21, 2011 (IT) .............................. TO2011U0125

(51) Int. Cl.
*B65D 88/54* (2006.01)
*B67D 7/30* (2010.01)
(Continued)

(52) U.S. Cl.
CPC ............ *B67D 7/301* (2013.01); *B01F 11/0074* (2013.01); *B01F 13/1055* (2013.01); *B01F 15/0237* (2013.01); *B67D 7/78* (2013.01); *B01F 2003/0028* (2013.01); *B01F 2215/005* (2013.01)

(58) Field of Classification Search
CPC ............ B44D 3/06; B67D 7/301; B67D 7/78; B01F 11/0074; B01F 13/1055; B01F 15/0237; B01F 2003/0028; B01F 2215/005; B01F 3/1221
USPC .................................................. 222/309, 318
See application file for complete search history.

(56) References Cited

U.S. PATENT DOCUMENTS 694,210 A 2/1902 Soellner
1,045,964 A * 12/1912 Friese ................. B05B 11/3001 222/110

(Continued)

FOREIGN PATENT DOCUMENTS

| | | | |
|---|---|---|---|
| EP | 1 908 510 | A2 | 4/2008 |
| GB | 2 333 047 | A | 7/1999 |
| WO | WO 01/17668 | A1 | 3/2001 |

OTHER PUBLICATIONS

International Search Report for corresponding International Patent Application No. PCT/IB2012/056568 mailed Feb. 27, 2013.

*Primary Examiner* — Patrick M Buechner
(74) *Attorney, Agent, or Firm* — Merchant & Gould P.C.

(57) ABSTRACT

Apparatus for metering liquids includes a tank for liquid being metered, a pipe for drawing off the liquid, having an end nozzle. A recirculation pipe communicates with the pipe and the tank. A reversible pump operable in suction or compression mode includes a non-return valve to close the recirculation pipe to draw off metered liquid and open the recirculation pipe, closing the pipe when the pump is in compression mode. A shut-off valve communicates with the pump, the delivery nozzle and the pipe for closing in the delivery nozzle direction and for opening in the pump direction, to allow, in suction mode, drawing a metered quantity of liquid and, in compression mode, selective recirculation of the liquid. At a second position in compression mode, the valve opens in the delivery nozzle direction and closes the pipe to deliver a metered quantity of liquid into a storage container.

5 Claims, 3 Drawing Sheets

(51) Int. Cl.

| | |
|---|---|
| ***B01F 11/00*** | (2006.01) |
| ***B01F 13/10*** | (2006.01) |
| ***B01F 15/02*** | (2006.01) |
| ***B67D 7/78*** | (2010.01) |
| *B01F 3/00* | (2006.01) |

(56) References Cited

U.S. PATENT DOCUMENTS 3,085,715 A * 4/1963 Douglas .............. A47L 15/4418 222/145.7
3,122,272 A * 2/1964 Marsh ................. B01F 13/1055 222/135
3,207,384 A * 9/1965 Wall ...................... G01F 11/021 222/129.2
3,223,291 A * 12/1965 Thomas .................. G01F 11/08 222/249
4,027,785 A 6/1977 Edstrom et al.
5,397,219 A * 3/1995 Cretors ................... F04C 14/26 137/107
6,164,497 A * 12/2000 Chia ................... B01F 15/0237 222/309
6,164,499 A * 12/2000 Chia ................... B01F 13/1055 137/625.41
6,616,322 B1 * 9/2003 Ashcroft ............... B01F 5/0218 366/167.2
2003/0183654 A1 * 10/2003 Voskuil ............... F16K 11/0876 222/144
2008/0029541 A1 2/2008 Wallace et al.
2012/0250451 A1 * 10/2012 Post ...................... B01F 5/0206 366/137

* cited by examiner

APPARATUS FOR METERING LIQUIDS

APPARATUS FOR METERING LIQUIDS

This application is a National Stage Application of PCT/IB2012/056568, filed 20 Nov. 2012, which claims benefit of Ser. No. TO2011U000125, filed 21 Nov. 2011 in Italy and which application are incorporated herein by reference. To the extent appropriate, claim of priority is made to each of the above disclosed applications.

BACKGROUND OF THE INVENTION

The term “liquid” as used in the present description is understood as including viscous and non-viscous liquids as well as dispersions and fluid suspensions.

In particular, the invention relates to a machine for metering dyes and inks comprising a liquid phase and one or more solid pigments dispersed therein so as to form a homogeneous and stable product which, however, requires stirring and recirculation in order to maintain its homogeneity over time.

A problem in all the currently available machines, which generally have tanks exposed to the atmosphere, consists in the partial evaporation of the liquids and the deposition, on the bottom of the tank, of solid pigments. Such phenomena are responsible for significant variations in the flow characteristics of the product and variations in its colouring power (in the case of liquid dyes), resulting in a variation in the colouring capacity for the same metered amount used. Any variation in the colouring power which occurs with the tank full or nearly full, or in any intermediate filling situation, prevents or minimizes the possibility of obtaining over time identical tonalities of colour using the same quantity of dye.

In order to overcome this problem, during the reproduction of a given colour, the machines defined hereinbelow as belonging to Class 1 and 2 use a stirrer, but are not equipped with means for recirculation of the metered dyes; recirculation is envisaged only in much more costly apparatus which are defined below as belonging to Class 4.

The tinting machines for metering dyes for varnishes and paints, depending on their composition and performance characteristics, may be classified, by way of example, in four classes which are shown in the table below:

| CLASS | METERING | TECHNOLOGY | RECIRCULATION TO TOP OF TANK | COST |
|---|---|---|---|---|
| Class 1 | Manual metering performed by means of specially assigned staff operating the piston. Sequential metering performed by each metering circuit. | Plunger | No recirculation | Minimal |
| Class 2 | Automatic metering performed using a motor driving an actuating mechanism. Sequential metering performed by each metering circuit. | Plunger, bellows pump, screw pump, gear pump | No recirculation | Low |
| Class 3 | Automatic metering performed using a motor or an actuating mechanism. Simultaneous metering performed by several metering circuits. | Plunger, bellows pump, screw pump, gear pump | No recirculation | Average |
| Class 4 | Automatic metering performed using a motor or an actuating mechanism. Simultaneous metering performed by several metering circuits. | Plunger, bellows pump, screw pump, gear pump | The dyes are conveyed to the top of the tank using electrically activated valves | High |

The cost of production of these machines increases exponentially from Class 1 to Class 4.The machines with plunger pump, bellows pump or cavitation pumps, belonging to Class 2, represent approximately 70 to 80% of the world market, owing to their low production cost and consequently low sales price. All these machines do not have a circuit for recirculation of the dyes to the top of the tank. A machine belonging to Class 2 comprises, for each colouring agent to be metered, a tank communicating with a plunger pump, bellows pump or cavitation pump or other pumping means suitable for removing the dyes from the tank, manually or by means of a suitable drive system. An electronic control and operating unit, with associated software, may be provided for selecting and metering the required dyes and the metered quantity. In automatic tinting machines which belong to Class 4 and which use volumetric gear pumps, piston pumps or other pumping means and which are operated by a single motor or by multiple motors, the dyes are recirculated from the bottom of the tank to the top of the tank by means of a two-way or three-way solenoid valve, for each dye metering circuit. In this case, the consistency in reproduction of the colour tonality is very high, but these machines have, by way of a major drawback, a high production cost and high cost of spare parts, with the need for very expensive additional electrical/electronic components.

SUMMARY OF THE INVENTION

An object of the present invention is to provide a machine for metering liquids, in particular a tinting machine which overcomes the abovementioned drawbacks, while maintaining a low production cost and operational simplicity, and in particular which does not require the use of additional motors or solenoid valves or other electrical control means, while guaranteeing an optimum homogeneity of the metered liquid and optimum reproduction of the colour tonalities.

BRIEF DESCRIPTION OF THE DRAWINGS

Further advantages and characteristic features of the machine according to the invention will become clear from the detailed description below, with reference to the accompanying drawings, which are provided by way of a non-limiting example and in which.

DETAILED DESCRIPTION OF THE PREFERRED EMBODIMENTS

Figure 1:
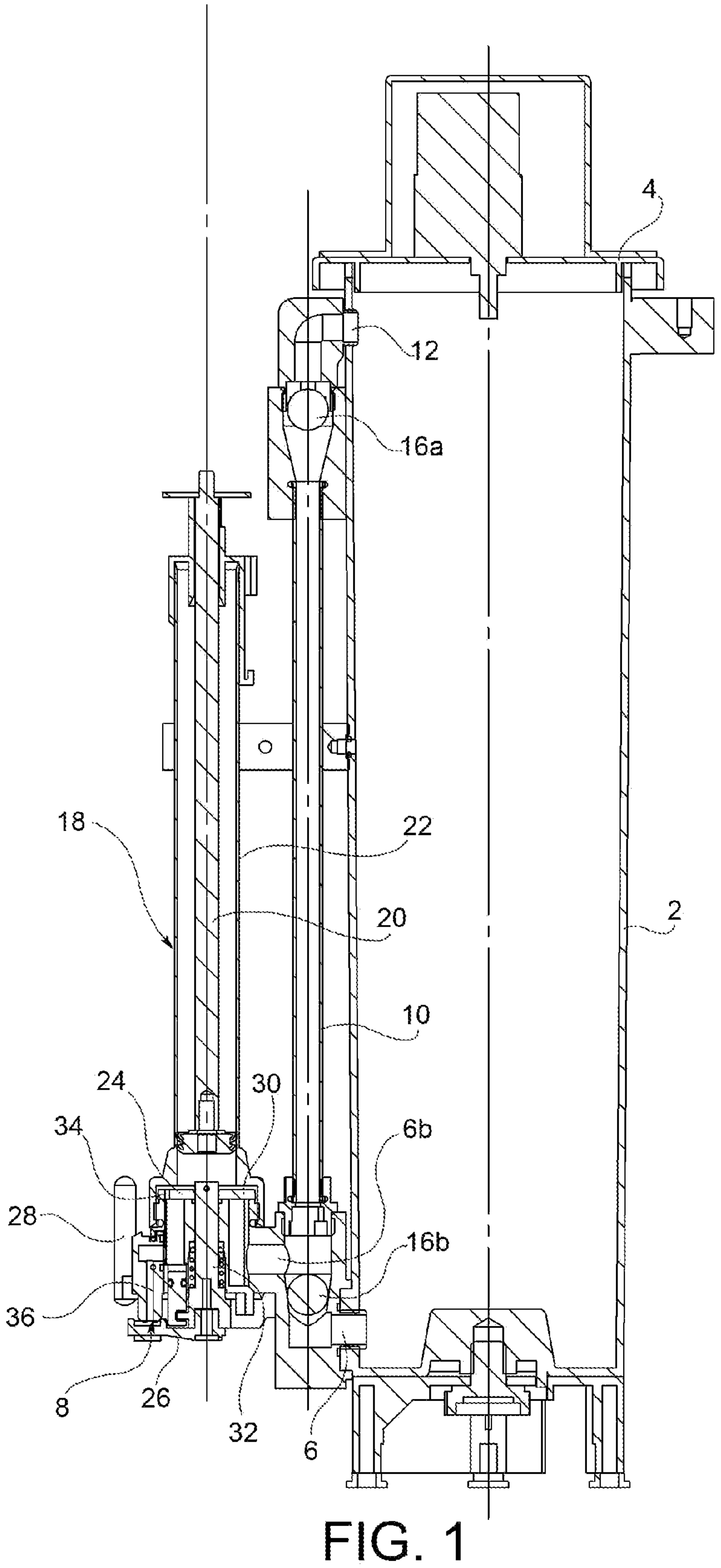
FIG. 1 is a partially sectioned schematic view which shows the structure of the metering machine according to the invention in a first position of the pumping means.
Figure 2:
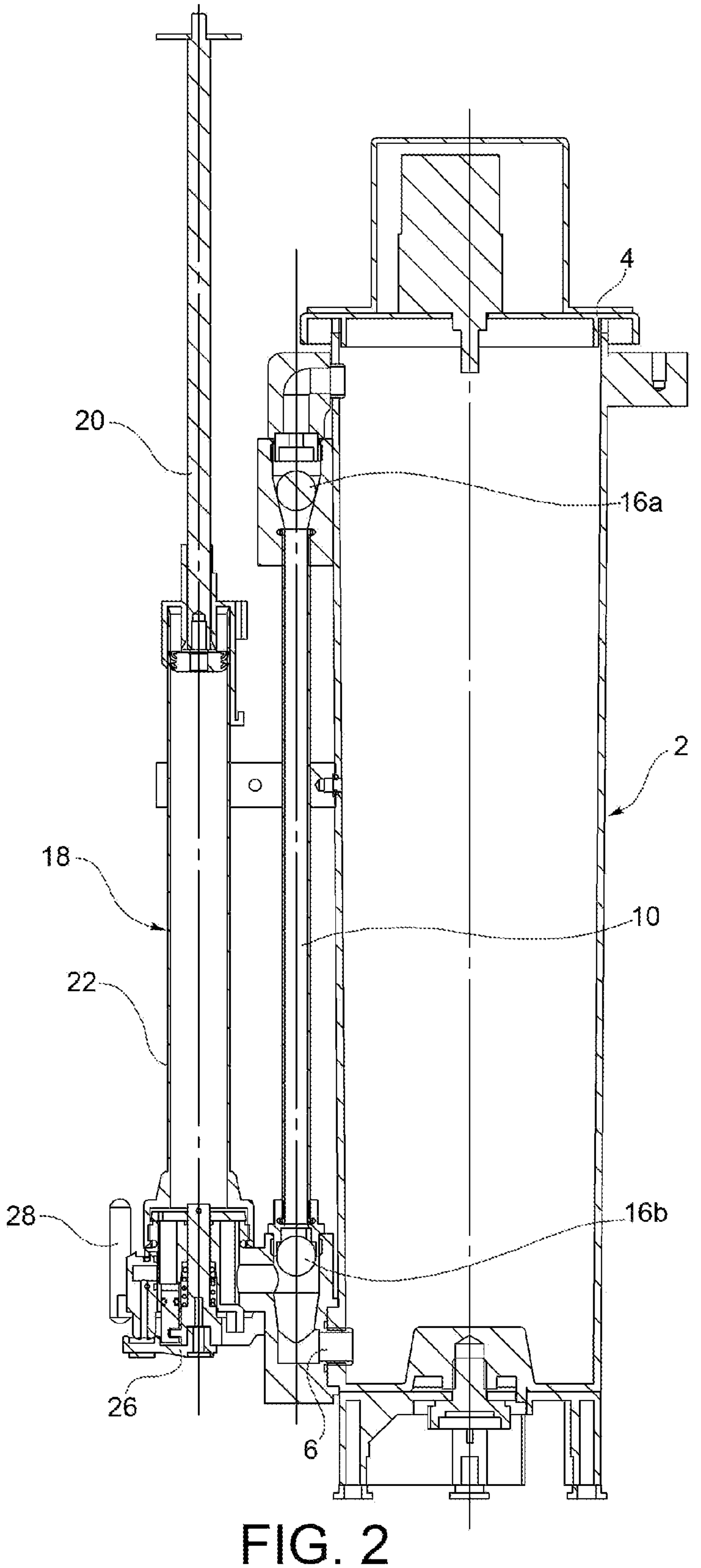
FIG. 2 is a partially sectioned schematic view of the machine according to FIG. 1 in which the pumping means are in a second operating position.
Figure 3:
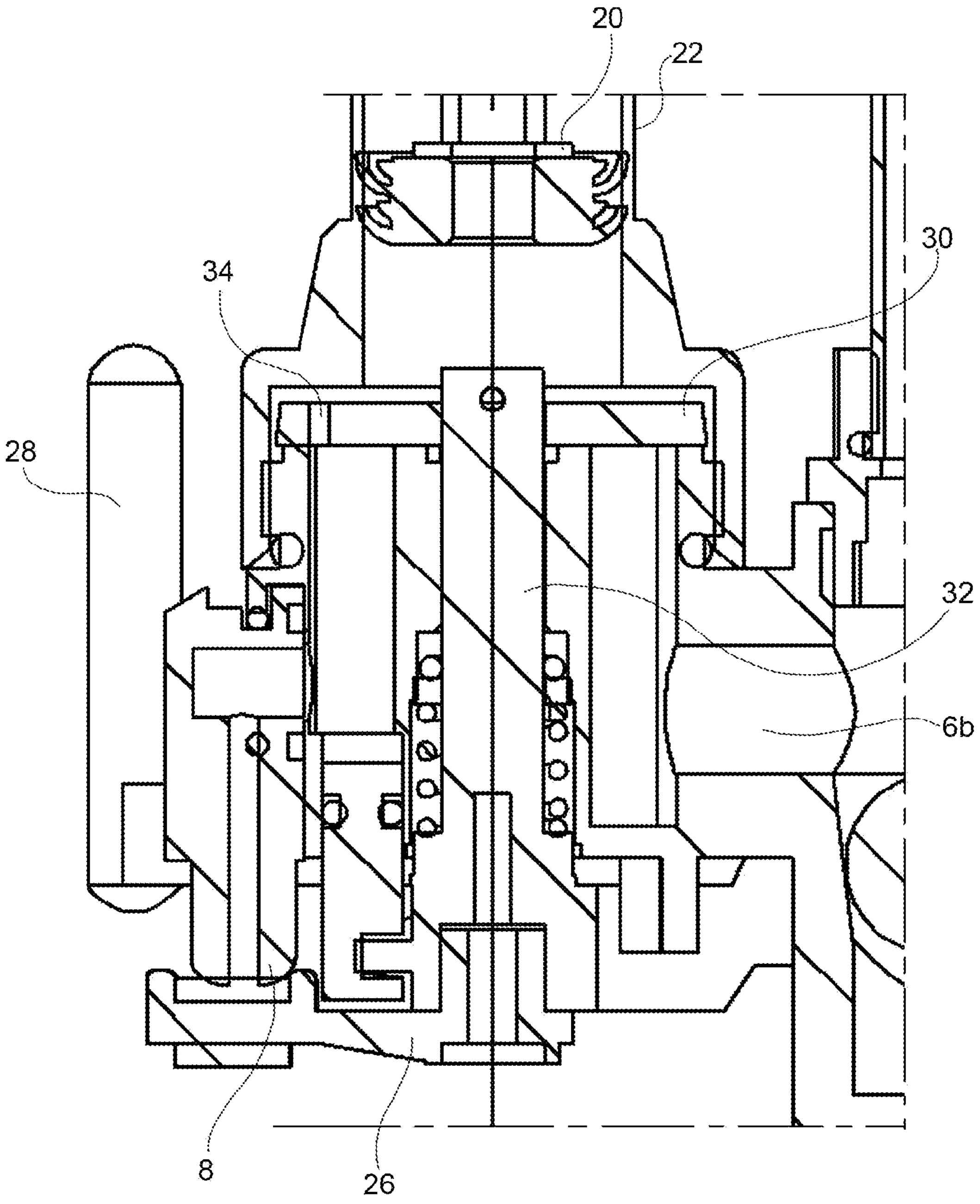
FIG. 3 is a view of FIG. 2 shown on a larger scale or in detail.

With reference to the drawings, the machine according to the invention comprises at least one tank 2 for the liquid to be metered, which may consist of any type of container, optionally provided with a removable lid 4 for introduction of the dye; preferably, the tank 2 is or is not provided with a stirrer.

A pipe 6 for drawing off the liquid to be metered is connected to the bottom of the tank 2 and terminates in a delivery nozzle or mouth 8 which supplies the metered liquid to a storage container (not shown). The draw-off pipe 6 communicates with a recycling pipe 10 which is provided in order to supply the non-metered liquid to the top region of the tank 2 via an inlet mouth 12 of the tank.

The machine also comprises pumping means 18 communicating with the draw-off pipe; typically, these pumping means consist of a piston pump, with a movable plunger 20 and a cylinder 22 intended to receive the quantity of liquid to be metered. The pumping means may moreover consist of any other type of pump suitable for performing metering, such as a bellows pump, or other reversible-action pumping means, namely means able to operate in suction or compression mode. Typically the pumping means consist of a piston pump or bellows pump which can be operated manually, but the use of pumping means operated by means of an electric or pneumatic motor is not excluded.

The recycling pipe has, associated therewith, non-return valve means 16*a* and 16*b* designed to close the recirculation pipe when the pumping means 18 are operated (in suction mode), so as to draw off a metered quantity of liquid from the tank 2, and open the recycling pipe, closing at the same time the draw-off pipe 6 at the tank delivery outlet, when the pumping means are operating in compression mode. The non-return valve means may consist of any non-return valve, ball valve or plunger valve, or other movable flow shut-off means. In particular, the valve means comprise a first non-return valve, for example ball valve 16*b*, able to assume a position for opening the draw-off pipe 6 and a position for closing the recycling pipe 10, and a second non-return valve, for example ball valve 16*a*, arranged upstream of the delivery mouth 12 of the recirculation pipe.

The metering machine also comprises shut-off valve means 24 communicating with the pumping means 20, with the delivery nozzle or mouth 8 and with the draw-off pipe 6, downstream of the non-return valve means 16*b*.

The shut-off valve means 24 are able to assume a position for closing the delivery nozzle or mouth 8 and simultaneously performing opening in the direction of the pumping means, thus allowing, when the pumping means are operated in suction mode, the liquid to flow into the piston cylinder (with opening of the valve 16*b* and closing of the valve 16*a*) and, when the pumping means are operated in compression mode, the liquid of the tank 2 to be recirculated, with opening of the valve 16*a* and closing of the valve 16*b* in the direction of the tank. Moreover, the shut-off means are able to assume a position for performing opening in the direction of the delivery nozzle and closing in the direction of the draw-off pipe leading from the non-return valve 16*b*, so as to allow metering of the liquid contained in the piston cylinder into a storage container.

In the example of embodiment shown, the shut-off valve means 24 comprise a rotating closing member 26 which can be manually operated by means of a handle 28 or servo-controlled and is able to assume a position for opening and closing the delivery nozzle. A second rotating closing member 30 is also provided, said member being connected to a shaft 32 to which the closing member 26 is connected and which is thus rotationally operated by means of the handle 28 or by means of a servo-control device. The rotating closing member 30 has at least one opening 34 which, following rotation of the closing member 30, selectively connects the cylinder 22 of the piston to a pipe for supplying the liquid to the nozzle 8 or to the section 6*b* of the draw-off pipe downstream of the non-return valve 16*b*.

As mentioned above, the liquid recirculation operation is performed with the closing member 26 in the closed position, by operating the pumping means 18 in suction and compression mode. The metering operation is performed with the closing member 26 in the open position where the shut-off valve prevents the liquid from flowing back to the draw-off and recirculation pipe.

The metering machine described above may be used as a stand-alone machine with a single metering circuit or may form part of a more complex apparatus comprising a plurality of metering circuits with associated dye tanks arranged in-line or on a rotating carousel. It is understood that the piston or bellows pump described above may be replaced by other pumps, for example by a screw pump or gear pump operated by a respective motor.

The apparatus may be designed to perform sequential simultaneous metering of the liquids and may be used in any application which requires volumetric metering of liquids, with limitation to the dye sector.

The invention claimed is:

1. Apparatus for metering one or more liquids, comprising: at least one tank for liquid to be metered;

a draw-off pipe for drawing off the liquid to be metered from the tank, having an end nozzle for delivery of the liquid to a storage container, a recirculation pipe communicating with the draw-off pipe and with the tank for recirculating to the tank the liquid to be metered;

a reversible pump associated with the draw-off pipe and able to operate in suction mode or compression mode;

a non-return valve associated with the recirculation pipe and designed to close the recirculation pipe when the pump is operated to draw off a metered quantity of the liquid from the tank and open the recirculation pipe, closing the draw-off pipe when the pump is operated in compression mode; and a shut-off valve communicating with the pump, with the end nozzle and with the draw-off pipe and able to assume the position for closing the end nozzle and for performing opening in the direction of the pump, so as to allow, when the pump is operated in suction mode, drawing off of a metered quantity of the liquid from the tank and, when the pump is operated in compression mode, selective recirculation of the liquid to a top of the tank, and able to assume a second position for performing opening in the direction of the end nozzle and closing of the draw-off pipe so as to allow delivery of a metered quantity of the liquid into a storage container, when the pump is operated in compression mode.

2. The apparatus for metering according to claim 1, comprising a first non-return valve adapted for closing the draw-off pipe while simultaneously opening the recirculation pipe when the pump is operated in compression mode and for closing the recirculation pipe and opening the draw-off pipe when the pump is operated in suction mode.

3. The apparatus for metering according to claim 2, comprising a second non-return valve arranged in the recirculation pipe and designed to assume a position for opening the recirculation pipe when the pump is operated in compression mode.

4. The apparatus for metering according to claim 1, wherein said shut-off valve comprises a first rotating closing member which can be operated between a position for opening the end nozzle and a position for closing said nozzle.

5. The apparatus for metering according to claim 4, comprising a second rotating closing member able to assume selectively a position for closing the draw-off pipe and a position for opening said draw-off pipe.

* * * * *